United States Patent
Patel

(10) Patent No.: US 10,401,899 B2
(45) Date of Patent: Sep. 3, 2019

(54) REGISTER CLOCK DRIVER FOR DDR5 MEMORY

(71) Applicant: Integrated Device Technology, Inc., San Jose, CA (US)

(72) Inventor: Shwetal Arvind Patel, San Jose, CA (US)

(73) Assignee: Integrated Device Technology, Inc., San Jose, CA (US)

(*) Notice: Subject to any disclaimer, the term of this patent is extended or adjusted under 35 U.S.C. 154(b) by 125 days.

(21) Appl. No.: 15/605,408

(22) Filed: May 25, 2017

(65) Prior Publication Data

US 2017/0344051 A1    Nov. 30, 2017

Related U.S. Application Data

(60) Provisional application No. 62/341,572, filed on May 25, 2016, provisional application No. 62/341,596, filed on May 25, 2016.

(51) Int. Cl.
G06F 13/16 (2006.01)
G06F 1/10 (2006.01)

(52) U.S. Cl.
CPC ............ *G06F 1/10* (2013.01); *G06F 13/1689* (2013.01); *Y02D 10/14* (2018.01)

(58) Field of Classification Search
None
See application file for complete search history.

(56) References Cited

U.S. PATENT DOCUMENTS

| 2002/0065997 | A1* | 5/2002 | Hsu | G06F 13/18 711/158 |
| 2008/0030185 | A1* | 2/2008 | Metsker | G06F 1/266 323/304 |
| 2009/0116330 | A1* | 5/2009 | Yang | G11C 8/06 365/230.08 |
| 2016/0293239 | A1* | 10/2016 | Giovannini | G11C 29/44 |

* cited by examiner

*Primary Examiner* — Paul Yen
(74) *Attorney, Agent, or Firm* — Haynes and Boone, LLP

(57) ABSTRACT

A register clock driver for a DDR5 memory is presented. A register clock driver (RCD) can include a logic having one or more input channels, each of the one or more input channels receiving input signals; and a plurality of ranked output ports associated with each of the one or more input channels, the logic providing the input signals received on each of the one or more input channels to the associated plurality of ranked output ports according to control signals. The RCD can operate in a default mode, wherein input signals from the input channels are output to both of the output ports associated with that channel, or can operate in a non-default mode where input signals from the input channels are sent to the appropriate ranked output port associated with that channel. In either case, unused signaling on the output ports is held high.

17 Claims, 3 Drawing Sheets

Figure 3

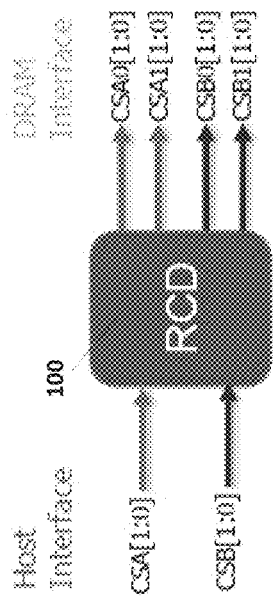
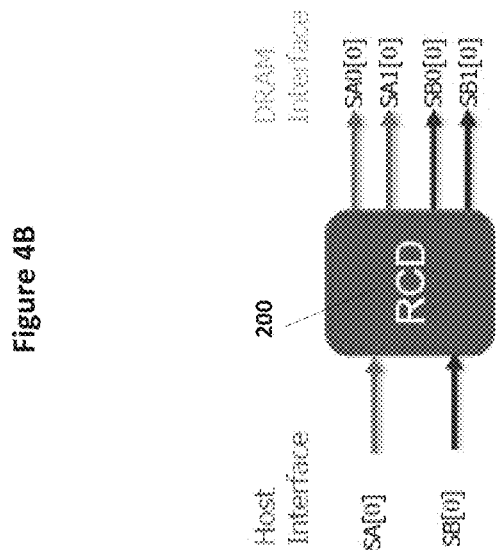
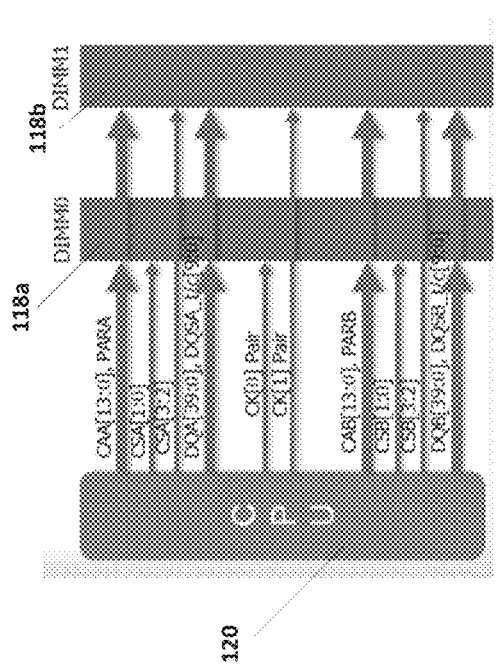
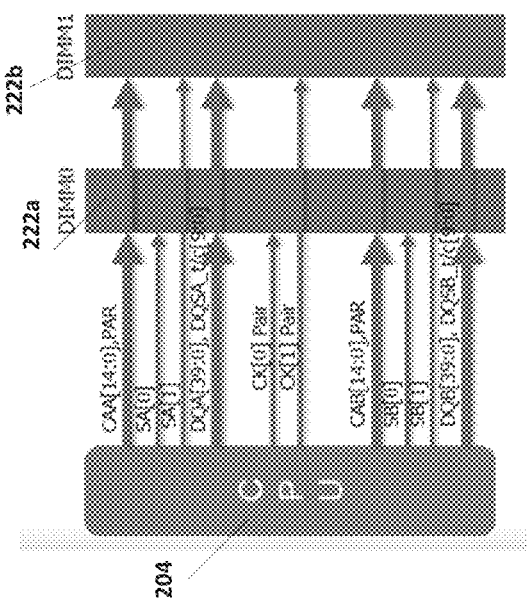

REGISTER CLOCK DRIVER FOR DDR5 MEMORY

RELATED APPLICATIONS

The present application claims priority to U.S. Provisional Application Ser. No. 62/341,572, filed on May 25, 2016, entitled "DDR5 RCD—Technique for Power Optimization, Reduction of Simultaneous Switching Signals, Reduction of Signals Switching to Low," and to U.S. Provisional Application Ser. No. 62/341,596, filed on May 25, 2016, entitled "DDR5 DRAM/RCD Protocol Optimization and Pin Count Reduction for Host, RCD and DIMM Connector," which is herein incorporated by reference in its entirety.

BACKGROUND

Technical Field

Embodiments of the present invention are related development of DDR5 DRAM memories and, in particular, to techniques for power optimization, reduction of simultaneous switching signals, and reduction of signals switching to low in a registering clock driver.

Discussion of Related Art

Developers are currently working on design of a new generation of double data rate (DDR) memory, DDR5. DDR5 memory will succeed the current DDR4 memory, which is widely used in PCs, servers, graphics, networking, embedded market and is finding its way into smart phone platforms. DDR5 memory, in accordance with the Joint Electron Device Engineering Council (JEDEC) memory setting standard, will have higher memory capacity of DDR4 DRAM and DDR4 DIMM. DDR5 memory is expected to be two times faster than DDR4 memory and is also expected to be more power efficient than current DDR4 memory.

Consequently there is a need for optimized DDR system structures for the DDR5 standard.

SUMMARY

In accordance with aspects of the present invention, register clock driver for a DDR5 memory is presented. A register clock driver (RCD) can include a logic having one or more input channels, each of the one or more input channels receiving input signals; and a plurality of ranked output ports associated with each of the one or more input channels, the logic providing the input signals received on each of the one or more input channels to the associated plurality of ranked output ports according to control signals. The RCD can operate in a default mode, wherein input signals from the input channels are output to both of the output ports associated with that channel, or can operate in a non-default mode where input signals from the input channels are sent to the appropriate ranked output port associated with that channel. In either case, unused signaling on the output ports is held high.

In some embodiments, a DDR5 RCD includes a logic receiving input from a CPU on input ports; and two ranked output ports for each of the CPU input ports.

These and other embodiments are further discussed below with respect to the following figures.

BRIEF DESCRIPTION OF THE DRAWINGS

FIG. 3 illustrates a command structure for the DDR5 RCD and DDR5 DRAM illustrated in FIG. 2.

FIGS. 4A, 4B, 4C and 4D illustrate reduction of pins in some embodiments compared to industry proposals.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
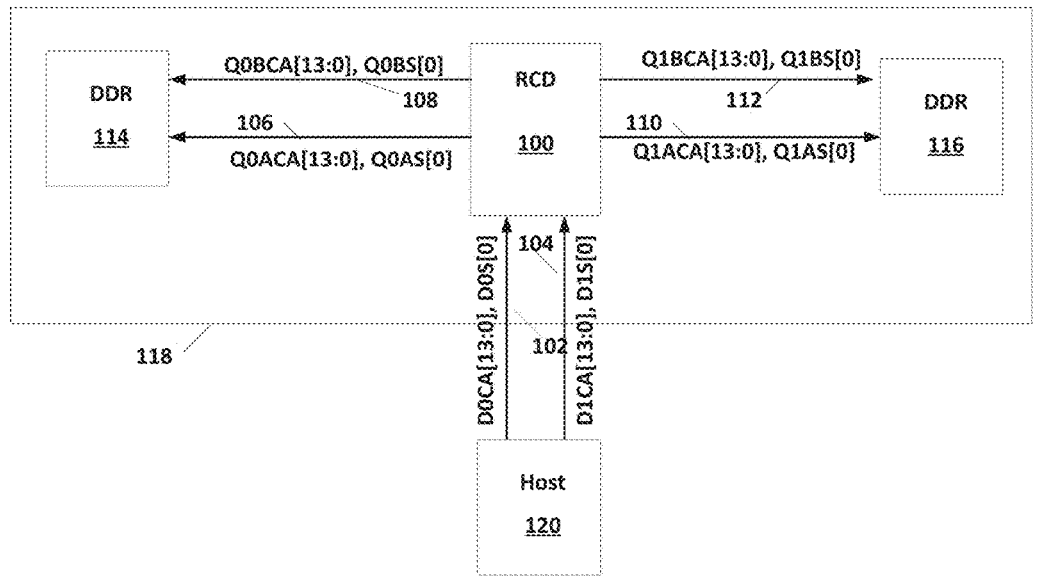
FIG. 1 illustrates an industry proposal for a DDR5 RCD.

FIG. 1 illustrates a currently proposed DDR5 RCD structure and operation. As is shown in FIG. 1, in the currently proposed DDR5 RCD 100, the interface has two output ports for each input signal from a host 120. As is illustrated, RCD 100 includes a first input 102 with port 0 inputs and a second input 104 with port 1 inputs. As is illustrated, first input 102 receives address D0CA[13:0] and command D0S[0] while second input 104 receives address D1CA[13:0] and command D1S[0]. For each input signal, RCD 100 provides two output signals. As shown in FIG. 1, the signals on input 102 is provided as outputs 106 and 108 while the input signals on input 104 are output on outputs 110 and 112. As is illustrated, each signal on input 102 is provided as an A output 106 and a B output 108 while each signal on input 104 is provided as an A output 110 and a B output 112. A output 106 and B output 108 are provided to DDR DRAM 114 while A output 110 and B output 112 are provided to DDR DRAM 116. DDR DRAM 114 and DDR DRAM 116 can each be one or more DDR5 compatible memory chips. DDR 114, DDR 116, and RCD 100 can be mounted on a dual in-line memory module (DIMM) 118.

The signals on A output 106 follow the signals on input 102 while the signals on B output 108 are inverted from the input signals on input 102. Similarly, the signals on A output 110 follow signals received on input 104 while signals on B output 112 are inverted from signals received on input 104. Consequently, DDR 114 receives signals on A output 106 and the inverted signals on B output while DDR 116 receives signals on A output 110 and the inverted signals on B output 112.

There are significant power concerns with this DDR5 RCD proposal as illustrated in FIG. 1 if we assume a DIMM with two identical loads on two ports (output A and output B) on each channel (channel 0 and channel 1). As illustrated in FIG. 1, port 0 (corresponding to output A 106 or 110) is non-inverted and port 1 (corresponding to output B 108 or 112) is inverted. We also assume standard configurations, with on resistance Ron=27Ω, termination resistance Rterm=40Ω, and power supply voltage VDDQ=1.1V. We also assume VDDQ reference termination. Additionally, we will have a command CMD bandwidth utilization ratio of 37.5% (Average of three commands per burst). The power consumption is provided in Table 1. Additionally, in the example illustrated in FIG. 1, there are 15 input signals per channel (14 address signals and a command bit), which means that there are 30 output signals (15 output signals per channel) between the two ports. Consequently, with two channels as illustrated in FIG. 1, there are 60 signals across two channels (30 signals per channel) and the maximum number of signals drive low at any time will be 30.

Consequently, at idle, with all of the Part A signals being high and all of the port B signals being low, port A will require no power while the power consumption on port B for each signal will be given by P=IV=(VDDQ/(Ron+Rterm)) *VDDQ. Given the numbers provided above, and summing over each of the 15 signals in the channel, results in a 271 mW (=16.4 mA*1.1V*15) per channel or a total power consumption by the chip of 542 mW.

During operation, with 100% Data Bus Utilization, the power consumption is split between port A and port B. Consequently, the power consumption provided in port A is the total possible power consumption (the maximum idle power consumption $P_{Idl}$) times the command utilization ratio times ½ (estimating that 50% of the times lines will be driven low). The power consumption of port B, however, is given by $P_{Idl}$*(1−(command utilization rate))*15+Power A.

TABLE 1

|  | Port A (Per Ch.) | Port B (Per Ch) | Total term Power |
| --- | --- | --- | --- |
| Idle Power | 0 mW | 271 mW (16.5 mA*1.1 V*15) | 542 mW |
| 100% Data Bus Utilization | 51 mW (271 mW*0.375*0.5) | 220 mW (271 mW*0.625 + 51 mW) | 542 mW |
| 80% Data Bus Utilization | 41 mW (271 mW*0.5*0.8) | 230 mW 0.2*271 mW + 0.8*271 mW*0.625 + 41 mW | 542 mW |
| 50% Data Bus Utilization | 25 mW (271 mW*0.375*0.5*0.5 | 246 mW 0.5*271 mW + 0.5*271 mW*0.625 + 25 mW | 542 mW |

Figure 2:
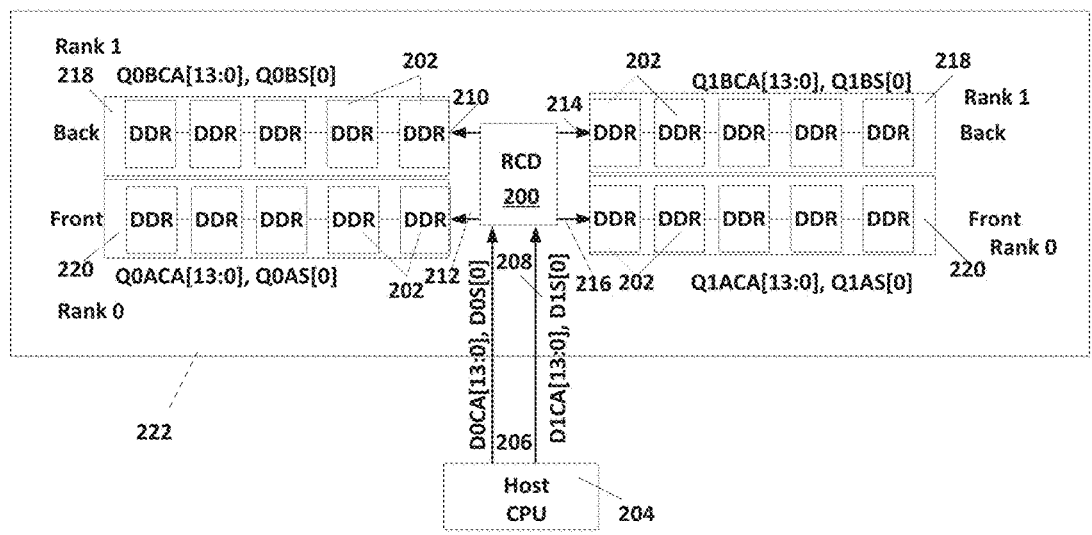
FIG. 2 illustrates a DDR5 RCD according to some embodiments.

As can be seen, the power consumption from the proposed RCD 100 is quite high and fairly constant at 542 mW. In essence, with this proposed configuration half of the signals will be high and half the signals will be low, resulting in a power consumption for the chip of 16.5 mA*1.1V*30 signals)=542 mW under all modes of operation FIG. 2 illustrates operation in accordance with the present invention. As is illustrated in FIG. 2, RCD 200 has two output ports for each input channel. As is illustrated, RCD 200 receives two channels from host CPU 204. As is illustrated in FIG. 2, each channel can receive address signals CA and chip select signals S. Although there are 14 address signals (CA[13:0]) and 1 chip select signal (S[0]) illustrated in each channel, other numbers of address signals and chip select signals may be used. As such, channel 0, on input 206, receives D0CA[13:0], D0S[0] and Channel 1, on input 208, receives D1CA[13:0], D1S[0]. Channel 0 input signals received on input 206 are directed to port A output 212 (Q0ACA[13:0],Q0AS[0]) and to port B outputs 210 (Q0BCA[13:0], Q0B[0]). Channel 1 input signals received on input 208 are directed to port A output 216 (Q1ACA[13:0], Q1AS[0]) and port B output 214 (Q1BCA[13:0], Q1BS[0]). DDRs 202 are arranged into two ranks, rank 0 including DDR group 220 and rank 1 including DDR group 218. In some embodiments rank 0 DDR, DDR group 220, may be mounted on the front of a DIMM package 222 while rank 1 DDR, DDR group 118, may be mounted on the back of the DIMM package 222.

In some embodiments, RCD 200 may have two modes of operation. In a default mode, all commands from host 204 are sent to both the A and B ports. For example, all commands on input 206 are provided to both output port A 212 and output port B 210 while all commands provided on input 208 are provided to output port A 216 and output port B 214. In some embodiments, this default mode may be allowed only when the address buss inversion (ABI) function is enabled.

In a non-default mode, in accordance with some embodiments when host 204 provides a channel 0, rank 0 command, RCD 200 drives output 212 (Q0ACA[13:0], Q0AS[0]) from input 206 (D0CA[13:0], D0S[0]). When host 204 provides a channel 0, rank 1 command, RCD 200 drives output 210 (Q0BCA[13:0], Q0BS[0]) from input 206 (D0CA[13:0], D0S[0]). Similarly, when host 204 provides a channel 1, rank 0 command, RCD 200 drives output 216 (Q1ACA[13:0], Q1AS[0]) from input 208 (D1CA[13:0], D1S[0]) while when host 204 provides a channel 1, rank 1 command, RCD 200 drives output 214 (Q1BCA[13:0], Q1BS[0]) from input 208 (D1CA[13:0], D1S[0]).

Consequently, RCD 200 does not produce two signals for each input signal, one of the output signals being an inverse of the input signal. Furthermore, when idle, all output signals (signals on port A outputs 212 and 216 and signals on port B outputs 210 and 212) can be pulled to VDDQ, reducing the power usage of RCD 200 at idle to zero in comparison with Table 1 above. Power usage for other areas will depend on individual signal states, with signals at VDDQ requiring no power while signals at a lower voltage requiring power. Consequently, the overall power usage of the RCD 200 is likely to be greatly reduced.

FIG. 2 and the above discussion is for a dual rank, dual channel system. However, a single rank DIMM can be accommodated using only one output port for each input channel. As discussed with FIG. 2, a dual rank DIMM can use one output port per rank. A Quad Rank DIMM can use one port for two ranks. One skilled in the art may be able to arrange the various output ports and ranks to accommodate other arrangements.

In some cases, there may be exceptions for dual rank and quad rank DIMMS. For example, PDE/PDX/SRE/SRX commands are broadcast across both ports A and B if the CSA bit is set. RD/WR/WR_Z commands are illustrated in Table 2 below. As is illustrated in Table 2, the input signals on a single channel distributed across Port A and Port B associated with that channel for RD, WR, and WR_Z commands are provided. As is illustrated, if unused signals on output ports are held high. Table 2 illustrates the $1^{st}$ input signal and $2^{nd}$ input signal on a channel and how the signals are distributed to the two output ports, Port A and Port B. All other commands are rank specific and only go to a single one of the output ports associated with the rank.

TABLE 2

| Command | | Port A | Port B |
|---|---|---|---|
| Rank-0 RD, WR, WR_Z | 1st UI | S, CA[0:13] = Host | S, CA[0:5] = Host CA[5] = Host S, CA[0:4, 6:13] = H |
| | 2nd UI | S, CA[0:13] = Host | |
| Rank 1 RD, WR, WR_Z | 1st UI | S, CA[0:5] = Host CA[6:13] = H | S, CA[0:13] = Host |
| | 2nd UI | CA[5] = Host S, CA[0:4, 6:13] = H | S, CA[0:13] = Host |

Figure 3:
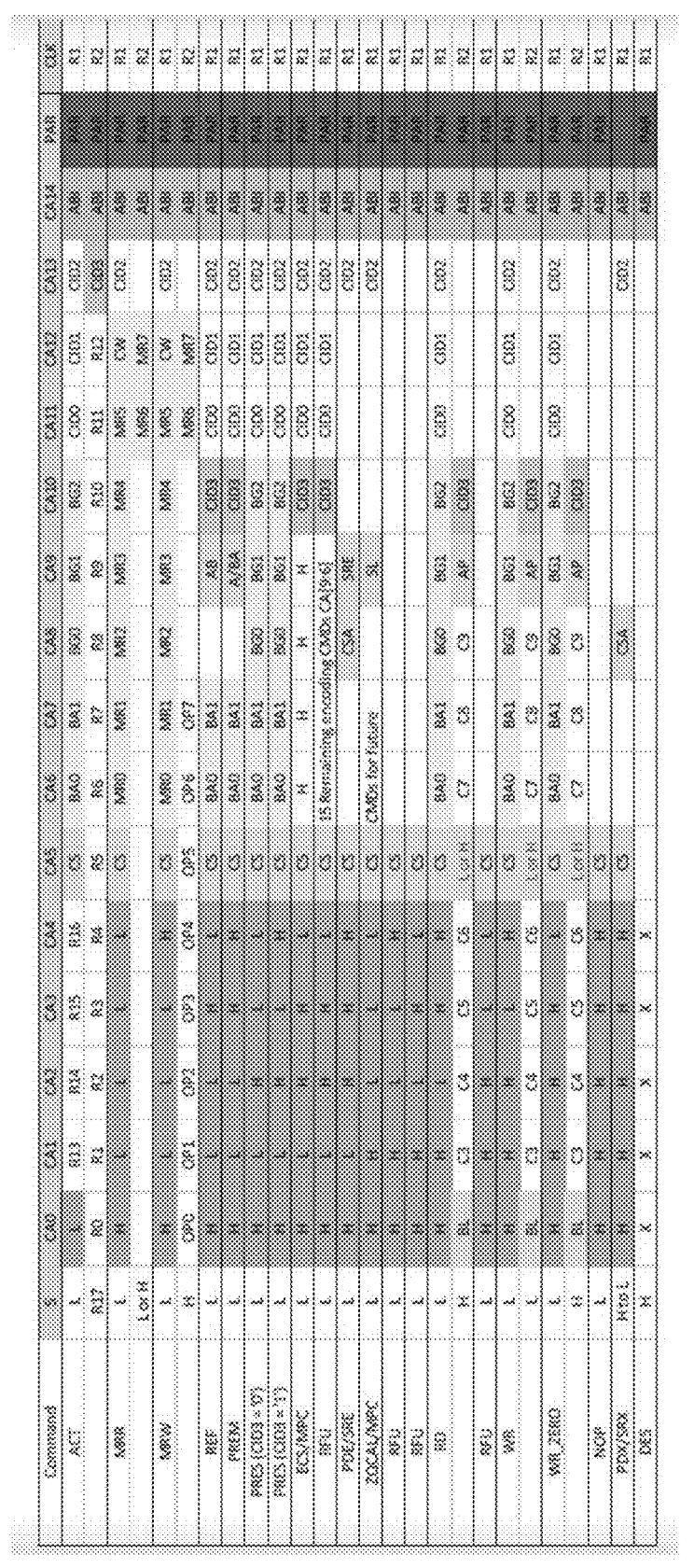

FIG. 3 illustrates an example of the Command Protocols for other commands to RCD 200 according to some embodiments of the present invention. Table 3 further illustrates the ODT termination matrix for some embodiments of the present invention. These embodiments achieve full flexibility of providing RTT_PARK, RTT_WR, RTT_NOM_WR, RTT_NOM_RD for target and non-target ranks according to some embodiments of the present invention.

TABLE 3

| | CS Status | | Rank 0 | Rank 1 | Rank 0 | Rank 1 |
|---|---|---|---|---|---|---|
| Command | 1st UI | 2nd UI | Target | Non-Target | Non-Target | Target |
| WR or WR_Z | L | L | RTT_WR | RTT_PARK | | |
| | L | H | RTT_WR | RTT_NOM_WR | | |
| | H | L | | | RTT_PARK | RTT_WR |
| | H | H | | | RTT_NOM_WR | RTT_WR |
| RD | L | L | DRIVING | RTT_PARK | | |
| | L | H | DRIVING | RTT_NOM_RD | | |
| | H | L | | | RTT_PARK | DRIVING |
| | H | H | | | RTT_NOM_RD | DRIVING |

Embodiments of RCD 200 according to certain embodiments exhibit multiple advantages. Table 4 illustrates the power usage of RCD 200 using the same assumptions that were used to generate the power usage outlined in Table 1: Ron=27Ω, Rterm=40Ω, VDDQ=1.1V, and the CMD bandwidth utilization ration of 37.5%. With RCD 200, however, the maximum number of signals switching at work case is 30 across two channels (15 signals per channel), which as an added advantage significantly improves the signal interference (SI) performance over that of RCD 100. Furthermore, the maximum number of signals driven low is 30 across two channels (15 per channel). It is also assumed in these calculations that there is no ABI function.

A comparison of the power used by proposed RCD 100 illustrated in FIG. 1 and the power used by RCD 200, which is an embodiment of the present invention, is provided in Table 4. The total power for RCD 200 can be calculated as follows. At Idle, all signals are high, which means that RCD 200 uses no power. With 100% Data Bus Utilization, the power for each low signal is given by 16.4 mA*1.1V. Since there are potentially 30 signals, with a CMD bandwidth utilization of 35.5% and assuming that on average 50% of the signals will be low, we arrive at about 122 mW of power. An additionally 20 mW estimates the amount of power used in the protocol overhead of this scheme. Consequently, the power used in RCD 200 is provided in Table 4 below.

TABLE 4

| | Total Term Power RCD 100 | Total Term. Power RCD 200 |
|---|---|---|
| Idle | 542 mW | 0 |
| 100% Data Bus Utilization | 542 mW | 122 mW (102 mW + 20 mW) |
| 80% Data Bus Utilization | 542 mW | 98 mW (82 mW + 16 mW) |

TABLE 4-continued

| | Total Term Power RCD 100 | Total Term. Power RCD 200 |
|---|---|---|
| 50% Data Bus Utilization | 542 mW | 60 mW (50 mW + 10 mW) |

Some embodiments of the present invention can also include an ABI function. Referring back to FIG. 2, host 204 can maximize the number of high level signals ("1"s) by counting and can send the ABI value to RCD 200 in the information with the addr signals. Host 204 can invert the signals if the number of high level signals is low. RCD 200 can then passes this to DRAMs 218 and 220, which inverts the signals if the ABI is low. This applies only to the target rank and port. This results in one additional signal to DRAMs 218 and 220, no strap pin is used. Host 204 computes the parity after the ABI calculation.

Using the ABI can provide additional power savings for RCD 200. This power savings may be in the 12 to 13% range. Using ABI, the maximum # of signals switching in the same direction at work case is 16 across two channels (8 per channel), which again significantly improves the signal interference (SI). Additionally, the maximum number of signals driven low is 16 across two channels (8 per channel).

FIGS. 4A through 4C illustrate a comparison of the pin number requirements between RCD 100 as illustrated in FIG. 1 and RCD 200 as illustrated in FIG. 2. The comparison illustrates a reduction in the number of pins used in some embodiments of the present invention.

FIG. 4A illustrates the signals passing between CPU Host 120 and two DIMM packages, DIMM 118a and DIMM 118b. DIMM 118a and DIMM 118b are examples of DIMM 118 as illustrated in FIG. 1. FIG. 4B illustrates RCD 100 as illustrated in FIG. 4B. As is illustrated, chip select signals CSA[1:0] and CSB[1:0] are input to RCD 100. Chip select signals CSA[3:2] and CSB[3:2] are input to the corresponding RCD 100 on DIMM 118b. Table 5 illustrates the number of pins required for each of the signals illustrated in FIG. 4A between CPU host 120 and DIMMs 118a and 118b. Table 6 illustrates the number of pins on RCD 100.

TABLE 5

| CPU Pins | DIMM 118a | DIMM 118b | Total | DIMM 222a | DIMM 222b | Total |
|---|---|---|---|---|---|---|
| Address CAA, CAB | 14 | 14 | 28 | 15 | 15 | 30 |
| Parity PAR, PARA, PARB | 1 | 1 | 2 | 1 | 1 | 2 |
| Chip Select CSA, CSB, | 4 | 4 | 8 | 2 | 2 | 4 |

TABLE 5-continued

| CPU Pins | DIMM 118a | DIMM 118b | Total | DIMM 222a | DIMM 222b | Total |
|---|---|---|---|---|---|---|
| SA, SB | | | | | | |
| CPU Totals | | | 38 | | | 36 |

TABLE 6

| RCD Pins | RCD 100 Host side | RCD 100 A + B Side | Total | RCD 200 Host side | RCD 200 A + B Side | Total |
|---|---|---|---|---|---|---|
| Address CAA, CAB | 28 | 56 | 84 | 30 | 60 | 90 |
| Parity | 2 | 0 | 2 | 2 | 0 | 2 |
| Chip Select | 4 | 8 | 12 | 2 | 4 | 6 |
| RCD Totals | | | 98 | | | 98 |

FIG. 4C illustrates the signals from host 204 to DIMMs 222a and DIMMs 222b according to some embodiments of the present invention. DIMMs 222a and 222b are as described by DIMM 222 illustrated in FIG. 2. As illustrated in FIG. 4D, RCD 200 on each of DIMMs 222a and 222b receives chip select signals SA and SB, which are each one bit. Again, the number of bits for the interface between CPU 204 and DIMM 222a and DIMM 222b is illustrated in Table 5 while the number of bits on RCD 200 is illustrated in Table 6.

Tables 5 and 6 compare the number of bits used in the configuration of FIG. 1 and the number of bits used in the configuration of FIG. 2, which is an embodiment of the present invention. As illustrated in Table 6, both RCD 100 and RCD 200 have a total of 98 pins. However, the number of pins required between CPU 120 and DIMMs 118a and 118b is 38 pins while the number of pins required between CPU 204 and DIMMS 222a and 222b is 36 pins. Consequently, embodiments according to the present invention can reduce the number of pins in the DIMMs.

In some embodiments, various pins on the package of RCD 200 may be defined. RCD 200 may include a ball array pin arrangement with multiple pins associated with the various input signals.

In a two-rank DIMM, monolithic DRAM package, for example, the pins or CS0 and CS1 can be relabeled as S(Select) and Rank ID (RID0) pins, respectively. Both S and RID0 pins can be connected to the DRAM die. RID0 can be a strap pin where when RID0 is low (at VSS), R0 is connected, while if RID0 is high (at VDDP), then R1 is connected. The S pin is driven by the host. All commands are sent with the S pin asserted with the encoded rank 0 or rank 1 information on CS signal and CSA signals. Tables 7 and 8 illustrate the command definitions in this case.

TABLE 7

| S | CSA | CS | Definition |
|---|---|---|---|
| L | X | X | Deselect |
| H | L | L | R0 CMD |
| H | L | H | R1 CMD |
| H | H | X | R0 and R1 CMD |

TABLE 8

| RID | S | CSA | CS | Definition |
|---|---|---|---|---|
| X | L | X | X | Deselect |
| L | H | L | L | R0 Executes CMD R1 Ignores CMD |
| H | H | L | H | R1 Execues CMD R0 Ignores CMD |
| X | H | H | X | R0 and R1 Executes Command |

A two-rank DIMM-DPP packages works the same way as the monolithic package, however RID0 strap pins are not exposed externally. The DRAM vendor can tie DRAM bumps on the packages as follows: RID0=L (VSS)=R0; RID0=H (VDDP)=R1. The S pin can be exposed externally on the package.

A four (4) rank DIMM-DDP Package can also be specified. For example, another free pin (e.g. F1 in DRAM ball-out) can be assigned as RID1 pin. All three S, RID0 and RID1 pins can be connected to the DRAM die. RID0 and RID1 pins can be strap pins. The RID0 pin is not exposed on the DDP package. RID0 can be tied to VSS or VDD on the DRAM package. RID1 pin is exposed on the DDP packaged to be strapped to VSS or VDD on the DIMM board.

S pin is driven by host (or logic device). All commands (either option 1 or option 2 command truth table) are sent with S pin asserted along with encoded rank 0 or rank 1 information on CS bit as well as CSA bit and CID2 bit. A DRAM mode register bit to define function select for CID2 bit (either as Rank select or TSV Stack select).

As a summary, the pin count is reduced at the host processor, RCD logic device, and DIMM connector. The command protocol includes embedded information, and embodiments includes a DRAM rank identification method (SDP Pkg—1 and 2 Rank DIMMs, or DDP Pkg—2 and 4 rank DIMMS). Embodiments of the invention are applicable to all DDR5 RCD logic devices, all DDR5 host/cpu processors and memory controllers, all DDR5 DRAMs, and all DDR5 DIMM modules. Embodiments can lead to significant cost savings and power savings. Embodiments also provide a simple layout (platform and DIMM).

The above detailed description is provided to illustrate specific embodiments of the present invention and is not intended to be limiting. Numerous variations and modifications within the scope of the present invention are possible. The present invention is set forth in the following claims.

What is claimed is:

1. A register clock driver (RCD), comprising:
 a logic having one or more input channels, each of the one or more input channels receiving input signals; and
 a plurality of ranked output ports associated with each of the one or more input channels, the logic providing the input signals received on each of the one or more input channels to the associated plurality of ranked output ports according to control signals,
 wherein the RCD is configured to operate in one of a default mode or a non-default mode,
 wherein in the default mode the input signals are provided to each of the plurality of output ports, and
 wherein in the non-default mode, when an RD, WR, or WR Z command is received on a channel of the one or more input channels, in a first rank a first set of input signals is coupled to a first port, a first portion of the first set of input signals is coupled to a second port, and a first remainder of signals on the second port is set to high.

2. The RCD of claim 1, wherein in a dual rank system, the logic provides the input signals from a first channel of the one or more input channels to a first ranked first channel output port of the plurality of ranked output ports when a first rank is received and couples the input signals from the first channel to a second ranked first channel output port of the plurality of ranked output ports when a second rank is received.

3. The RCD of claim 1, wherein in a single rank system, input signals from each of the one or more input channels is provided to one port of the plurality of ports associated with each of the one or more input channels.

4. The RCD of claim 1, wherein in a quad rank system, input signals from each of the one or more input channels is provided to output ports associated with the input channel and the rank.

5. The RCD of claim 1, wherein in non-default mode in the RD, WR, or WR_Z command, in the first rank, a second set of input signals is coupled to the first portion, a second portion of the second set of input signals is coupled to the second port, and a second remainder of signals on the second port are set to high.

6. The RCD of claim 1, wherein in non-default mode at least some commands received on a channel of the one or more input channels are provided to all of the plurality of ranked output ports associated with the channel.

7. The RCD of claim 1, wherein in non-default mode at least commands received on a channel of the one or more input channels are provided to a port of the plurality of output ports associated with a rank.

8. The RCD of claim 1, wherein in an idle state signals on each of the plurality of output ports are set to high so as to reduce power.

9. The RCD of claim 1, wherein the one or more input channels includes a first channel and a second channel and the plurality of ranked output ports includes a first port associated with the first channel, a second port associated with the first channel, a third port associated with the second channel and a fourth port associated with the second channel; and wherein the logic receives input signals from the first channel and couples the input signals to the first port for a first rank, and couples the input signal to the second port for a second rank; and wherein the logic receives signals from the second channel and couples the input signals to the third port for the first rank, and couples in the input signal to the fourth port for the second rank.

10. The RCD of claim 1, further including an address bus inversion function to maximize a count of high signals.

11. The RCD of claim 1, further including memory coupled to the plurality of ranked output ports.

12. A method of operating a memory module, comprising:
receiving in a register clock driver (RCD) first signals on a first channel;

outputting the first signals from the RCD on a first port associated with the first channel for a first rank; and
outputting the first signals from the RCD on a second port associated with the first channel for a second rank,
wherein the RCD is configured to operate in one of a default mode or a non-default mode,
wherein in the default mode the input signals are provided to each of the plurality of output ports, and wherein in the non-default mode, when an RD, WR, or WR Z command is received on a channel of the one or more input channels, in a first rank a first set of input signals is coupled to a first port, a first portion of the first set of input signals is coupled to a second port, and a first remainder of signals on the second port is set to high.

13. The method of claim 12, further comprising:
receiving in the RCD second signals on a second channel;
outputting the second signals from the RCD on a first port associated with the second channel for the first rank; and
outputting the second signals from the RCD on a second port associated with the second channel for the second rank.

14. The method of claim 13, wherein during an idle state, signals on the first port and the second port are held at a high state.

15. The method of claim 13, further including
receiving command signals on the first channel;
if the command signals are for a read or write command, directing the command signals to the first port for the first rank or directing the command signals to the second port for the second rank; and
if the command signals are not for the read or write command, directing a subset of the command signals to the second port for the first rank or directing the subset of the command signals to the first port for the second rank;
holding unused output signals from the first port or the second port at a high state.

16. The method of claim 13, further including
receiving command signals on the first channel;
directing the command signals to the first port for the first rank or the second port for the second rank; and
holding unused outputs signals from the first port or the second port at a high state.

17. The method of claim 13, further including
receiving command signals on the first channel; and
directing the command signals to both the first port and the second port.

* * * * *